United States Patent [19]
Dohmeier

[11] 3,871,431
[45] Mar. 18, 1975

[54] PROTECTIVE CHAINS
[75] Inventor: Hans Otto Dohmeier, Johannesburg, South Africa
[73] Assignee: Dome Inventions Limited, Johannesburg, South Africa
[22] Filed: Nov. 10, 1972
[21] Appl. No.: 305,281

[30]    Foreign Application Priority Data
   Nov. 25, 1971   South Africa...................... 71/7933

[52] U.S. Cl. .............................................. 152/243
[51] Int. Cl. ............................................ B60c 11/00
[58] Field of Search .................................... 152/243

[56]              References Cited
             UNITED STATES PATENTS
1,631,346   6/1927   Swoope............................. 152/243

FOREIGN PATENTS OR APPLICATIONS
1,480,887   4/1969   Germany ........................... 152/243
  487,004   4/1970   Switzerland........................ 152/243
  393,533   6/1933   Sweden............................. 152/243

Primary Examiner—Robert J. Spar
Assistant Examiner—Kenneth Noland
Attorney, Agent, or Firm—Young & Thompson

[57]            ABSTRACT

A protective chain for an automotive tire consists of a reticulation of elongate, end-perforated links, and connectors on to which the links are threaded, usually four to a connector, the connectors having open gaps to allow the threading of the links, and being shaped for the links to be threadable on to and separable from them only by relative rotational movement of the connector and link. The connectors are preferably omega-shaped or gammadions.

1 Claim, 5 Drawing Figures

PATENTED MAR 18 1975　　　　　　　　　　　　　　3,871,431

PROTECTIVE CHAINS

This invention relates to protective chains for automotive tyres, which consist of a reticulation of elongate, end-perforated links, and connectors on to which the links are threaded usually four to a connector.

BACKGROUND OF THE INVENTION

In current practice the connectors are closed, after the links have been threaded on to them. Apart from the fact that closing of the gap in each connector increases the manufacturing cost of the chain, when a repair has to be effected because of a broken link connectors have to be opened for a new link to be inserted, and then closed again. The obvious inconvenience of breaking a weld that permanently close the gap has led to the proliferation of detachable closure members that can withdrawn for the insertion of a new link, and then reclosed. These closure members, to be effective, are usually rather complicated and therefore add materially to the cost of the chain.

The object of the present invention is to provide a chain which is easier to assemble and disassemble than are chains in current use and which costs less than they do both to manufacture and to repair.

According to the invention, the connectors are loops, gapped to admit the links and shaped for the links to be threadable on to them only by relative rotational movement of loop and link. The corollary is that the connected loop and link are separable only by reverse relative rotational movement.

Since, in use, the chain elements are under tension or at least are not freely movable relatively to one another, the movement necessary to disengage a link from a connector is not permitted it, so that the connector gaps may be left open without fear of the chain coming apart. The only possible exceptions are the connectors at the edges of the chain, which may, because of flexing of the tyre, from time to time become loose enough to be disengaged from a link; and, to avoid this possibility the outermost loops may have a closure means.

The only other condition which must be observed is that the loops must be stout enough to resist such distortion in use as may allow separation.

DESCRIPTION OF EMBODIMENTS

Various embodiments of the invention are seen in the accompanying drawings, in which.

Figure 4:
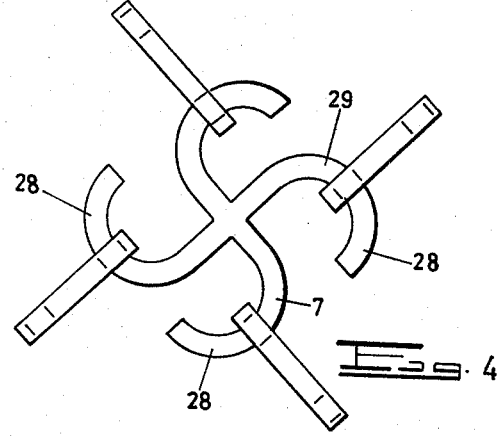
FIG. 4 is a face view of a second form of connector.

In the drawings, the chain links are numbered 10. Each consists of an elongate metal slab, which may be slightly curved, and, towards its ends, a hole 12. In the embodiment of FIG. 4, the holes are replaced by a single slot 14.

Figure 1:
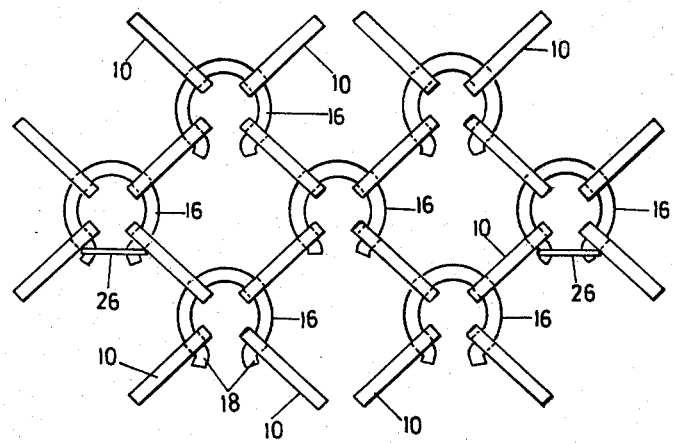
FIG. 1 is a face view of part of a chain according to the invention.
Figure 3:
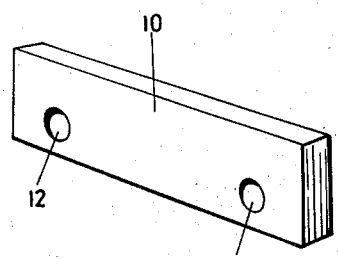
FIG. 3 is a perspective view of a link.
Figure 2:
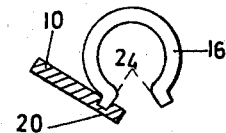
FIG. 2 is a fragmentary view showing a link about to be attached to a connector.

In FIG. 1, the connectors 16 are omega-shaped loops, the curvature of the splayed-out legs 18 being such that the links 10 can be threaded on to the loop by relative rotational movement of the loop and the link. To permit this to happen, the angle between the legs 18 and the body of the loop must be such as to allow the perforation 20 in the link to be offered to the leg as is seen in FIG. 2, and there must be sufficient play between the wall of the perforation and the leg to allow the link and the loop to be relatively rotated for the link to pass over the leg and be threaded on to the body of the loop through the gap 24 between the legs.

Each link is in turn threaded on to a loop, four to the loop, the free ends are threaded on to other loops, and so on until the reticulation has been completed.

In use, the elements of the chain are in tension, so that they are denied that freedom of movement which allows the reverse movement of the links relatively to the loops that is necessary to separate them.

The only possible exceptions are the outermost loops of the chain which, due to flexing of the tyre, may be allowed sufficient movement to free the links threaded on to them; an unlikely contingency but one which may be guarded against by closing the gaps 24 by means of simple closure members such as flat links 26 that are sprung over the legs 18 and held in position by the elasticity of the loops.

It has already been pointed out that a condition for success is that the loops be stout enough to resist such distortion as may allow separation of the links from the loops. In order that this may occur, it would be necessary for the loops to open out and for the legs 18 to be straightened sufficiently for the links to be pulled away from the loops. This possibility is avoided by making the loops of spring steel and sufficiently robust to resist deformation beyond the elastic limit under even abnormal conditions of service. The loops may be further strengthened by flattening their cross section.

The elasticity of loops made of spring steel has two other benefits. Firstly, it permits the loops to be pinched in sufficiently for closures such as 26 to be located, and secondly it allows for degree of stretch in the chain under unusual stress which protects the chain against breakage.

The chain depicted in FIGS. 1 and 2 has the preferred form of loop, but other shapes, square, triangular, lozenge-shaped, etc., may be used. Again, the necessity for relative rotational movement for engagement and separation of the links and the loops is, in the embodiment, brought about by the presence of the splayed-out legs of the omega. However, other configurations may be used. For instance, in FIG. 4, there is shown a connector which is a gammadion or akin to it with inturned leg ends 28, so that there each leg forms, with the adjacent arm, an open loop 29 to receive a link. There are thus four loops each of which accommodates a link.

Figure 5:
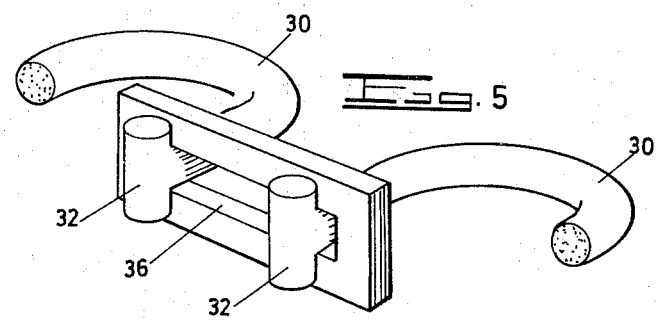
FIG. 5 is a perspective view of a third form of connector.

In FIG. 5, the loops 30 are akin to the omegas of FIG. 1, except that the legs end in feet 32 projecting normally to the plane of the loop. In order to permit engagement of the loops and the link 34, the holes in the links 10 of the earlier embodiments are replaced by two slots each long enough to pass the foot when the loop is rotated to bring the foot into coincidence with the slot, and narrow enough to trap the foot when the loop is rotated back into its original orientation with the link. Alternatively the two slots may be joined to form a single slot 36 as is seen in the figure.

While in use all loops except perhaps the edge loops are open, it may be desirable to close the gaps of all the loops temporarily during assembly or transplant, to stop unintentional separation of the loose links and loops. A twine of thin wire around the legs of the loop will suffice for this purpose.

The major feature of the chain of the invention is, of course, the ease and rapidity with which it can be assembled and the low cost relatively to most chains at present in use. It should be pointed out, too, that another important feature is the ease and rapidity with which a damaged chain can be repaired. It is necessary only to loosen the chain and replace the broken link or loop.

The invention consists also in loops such as those illustrated and described, for making and repairing tyre chains.

I claim:
1. A tire chain consisting of a reticulation of elongate, end-perforated links, and connector links onto which the links are threaded, characterized in that:

each connector link is an omega-shaped open loop, gapped to allow links to be threaded onto it, and shaped for a link to be threadable onto and be separable from it only by movement of the connector link and the link relative to each other along an arc and in which there are four links on each of a plurality of loops.

* * * * *